(12) United States Patent
Murata et al.

(10) Patent No.: US 7,213,873 B2
(45) Date of Patent: May 8, 2007

(54) VEHICLE FRONT-PART STRUCTURE

(75) Inventors: Shin Murata, Fuchu-cho (JP); Shinichi Konuma, Fuchu-cho (JP); Masanobu Hanazaki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 159 days.

(21) Appl. No.: 11/065,079

(22) Filed: Feb. 25, 2005

(65) Prior Publication Data

US 2005/0212334 A1    Sep. 29, 2005

(30) Foreign Application Priority Data

| Mar. 25, 2004 | (JP) | ............................. 2004-090190 |
| Mar. 25, 2004 | (JP) | ............................. 2004-090191 |
| Mar. 25, 2004 | (JP) | ............................. 2004-090192 |

(51) Int. Cl.
    *B60J 7/00* (2006.01)
(52) U.S. Cl. .................................. 296/204; 296/187.09
(58) Field of Classification Search ................ 296/204, 296/187.09, 203.02
    See application file for complete search history.

(56) References Cited

U.S. PATENT DOCUMENTS

| 2,954,998 | A | * | 10/1960 | Kushler et al. ............. 296/204 |
| 3,912,295 | A | * | 10/1975 | Eggert, Jr. ................... 280/784 |
| 5,048,888 | A | * | 9/1991 | Willy et al. ............ 296/187.09 |
| 5,085,484 | A | * | 2/1992 | Mori ........................... 296/204 |
| 5,103,392 | A |   | 4/1992 | Mori |
| 5,884,963 | A |   | 3/1999 | Esposito et al. |

(Continued)

FOREIGN PATENT DOCUMENTS

EP        0 926 048 A2    6/1999

(Continued)

OTHER PUBLICATIONS

European Search Report, No. EP 05004334, Apr. 26, 2006.
Partial European Search Report dated Feb. 21, 2006.

*Primary Examiner*—Kiran B. Patel
(74) *Attorney, Agent, or Firm*—Nixon Peabody LLP; Donald R. Studebaker

(57) ABSTRACT

An automobile front-part structure is provided in which an impact-absorbing member can absorb the impact energy that is given by a bump, whatever bump it is, such as an offset collision and a pole bump. This automobile front-part structure including: a pair of vehicle-body frames which extends in the front-and-rear directions along both sides of a vehicle, and whose front-end parts extend up to the front part of an automobile; and a front sub-frame which is supported with the vehicle-body frames in the front part of the vehicle, and is disposed below the vehicle-body frames, in which the front sub-frame includes: a front sub-frame main-body which has, a pair of right and left side frames which extends in the front-and-rear directions of the vehicle, and a cross member which is formed by a reinforcement and bridges the front parts of the side frames; a pair of right and left impact absorbing members which is formed by a crush pipe, is disposed at the front-end parts of the side frames in the front sub-frame main-body and absorbs impact energy from ahead; and a reinforcement which bridges the front ends of both impact absorbing members.

19 Claims, 5 Drawing Sheets

U.S. PATENT DOCUMENTS

| | | | |
|---|---|---|---|
| 6,109,654 A * | 8/2000 | Yamamoto et al. | 280/784 |
| 6,511,096 B1 * | 1/2003 | Kunert et al. | 280/785 |
| 6,619,730 B2 * | 9/2003 | Porner | 296/204 |
| 6,679,523 B2 * | 1/2004 | Yamamoto et al. | 296/204 |
| 6,736,448 B2 * | 5/2004 | Hanakawa et al. | 296/187.09 |
| 6,948,767 B2 * | 9/2005 | Makita et al. | 296/187.09 |
| 6,957,846 B2 * | 10/2005 | Saeki | 296/187.09 |
| 2002/0029921 A1 | 3/2002 | Dau et al. | |

FOREIGN PATENT DOCUMENTS

| | | |
|---|---|---|
| EP | 1 312 536 A2 | 5/2003 |
| EP | 1306289 | 5/2003 |
| EP | 1308372 | 5/2003 |
| EP | 1 477 392 A2 | 11/2004 |
| FR | 2 832 686 | 5/2003 |
| JP | 08085473 | 4/1996 |
| JP | 2514565 | 8/1996 |
| JP | 2002-160663 | 6/2002 |
| JP | 2003-146242 | 5/2003 |
| WO | WO 99/66714 | 12/1999 |

* cited by examiner

VEHICLE FRONT-PART STRUCTURE

BACKGROUND OF THE INVENTION

1. Field of the Invention

The present invention relates to an automobile front-part structure which includes side frames that are provided below vehicle-body frames of an automobile and extend in the vehicle front-and-rear directions. Particularly, it relates to an art where impact-absorbing members are provided at the vehicle-front parts of the side frames.

2. Description of the Related Art

Conventionally, for example, as disclosed in Japanese Utility Model Laid-Open No. 3-91282 (Japanese Utility Model Registration No. 2514565) specification, it is publicly known that below a vehicle-body frame (for example, which corresponds to a front cross-member 12 according to this specification) of an automobile (i.e., a vehicle), there is provided a front sub-frame which is formed by a pair of right and left side frames which each extend close to the front-end part of the vehicle-body frame along the vehicle front-and-rear directions.

In addition, this specification describes the point that there is provided a pair of right and left impact absorbing members (which each corresponds to a protrusion portion according to this specification) which are each fixed on the front-end part of the front side frame and extend on the front side of the vehicle body.

According to such a configuration, when the vehicle has bumped at its front part, both the vehicle-body frame and the front side frame undergo a shaft compression along the vehicle front-and-rear directions. Thereby, they can absorb the impact energy. Particularly, even if the vehicle bumps, at its front part, into an obstacle which is lower than the front-end part of its vehicle-body frame, and the vehicle-body frame cannot bear the impact load substantially linearly in vehicle-body side view, then the front side frame which is located below the vehicle-body frame and is provided at its front-end part with the impact absorbing member can bear the impact load substantially linearly.

However, as disclosed in this specification, the impact-absorbing member is only provided at the front ends of both side frames of the front sub-frame. This configuration is effective at the time of a full-lapped collision between two vehicles. But, in the case of a right-and-left offset collision between two vehicles(i.e., an offset collision), both right and left impact absorbing members cannot absorb the impact energy. Besides, if a vehicle hits on a narrow object such as a pole (i.e., a pole bump),.then depending upon the bump position, the impact absorbing members could not absorb the impact energy at all.

BRIEF SUMMARY OF THE INVENTION

In view of the above described problems, it is an object of the present invention to provide an automobile front-part structure in which an impact absorbing member can absorb the impact energy that is given by a bump, whatever bump it is, such as an offset collision and a pole bump.

In order to attain the above described object, the present invention is configured as described below. The automobile front-part structure according to a first aspect of the present invention comprises: a pair of vehicle-body frames which extends in the front-and-rear directions along both sides of a vehicle, and whose front-end parts extend up to the front part of an automobile; and a front sub-frame which is supported with the vehicle-body frames in the front part of the vehicle, and is disposed below the vehicle-body frames, wherein the front sub-frame includes: a front sub-frame main-body which has, a pair of right and left side frames which extends in the front-and-rear directions of the vehicle, and a cross member which bridges the front parts of the side frames; a pair of right and left impact absorbing members which is disposed at the front-end parts of the side frames in the front sub-frame main-body, the impact absorbing members absorbing impact energy from ahead; and a reinforcement which bridges the front ends of both impact absorbing members.

According to this configuration, at the time of an offset collision, the impact absorbing member on the opposite side to the collision can absorb the impact energy via the reinforcement. In the case of a pole bump, both impact absorbing members can each absorb the impact energy, via the reinforcement.

These and other objects, features and advantages of the present invention will become more apparent upon reading of the following detailed description along with the accompanied drawings.

DETAILED DESCRIPTION OF INVENTION

Hereinafter, the automobile front-part structure according to each embodiment of the present invention will be described with reference to the drawings. Herein, the frames and the members according to each embodiment are made of steel, unless they are specifically mentioned otherwise.

Figure 1:
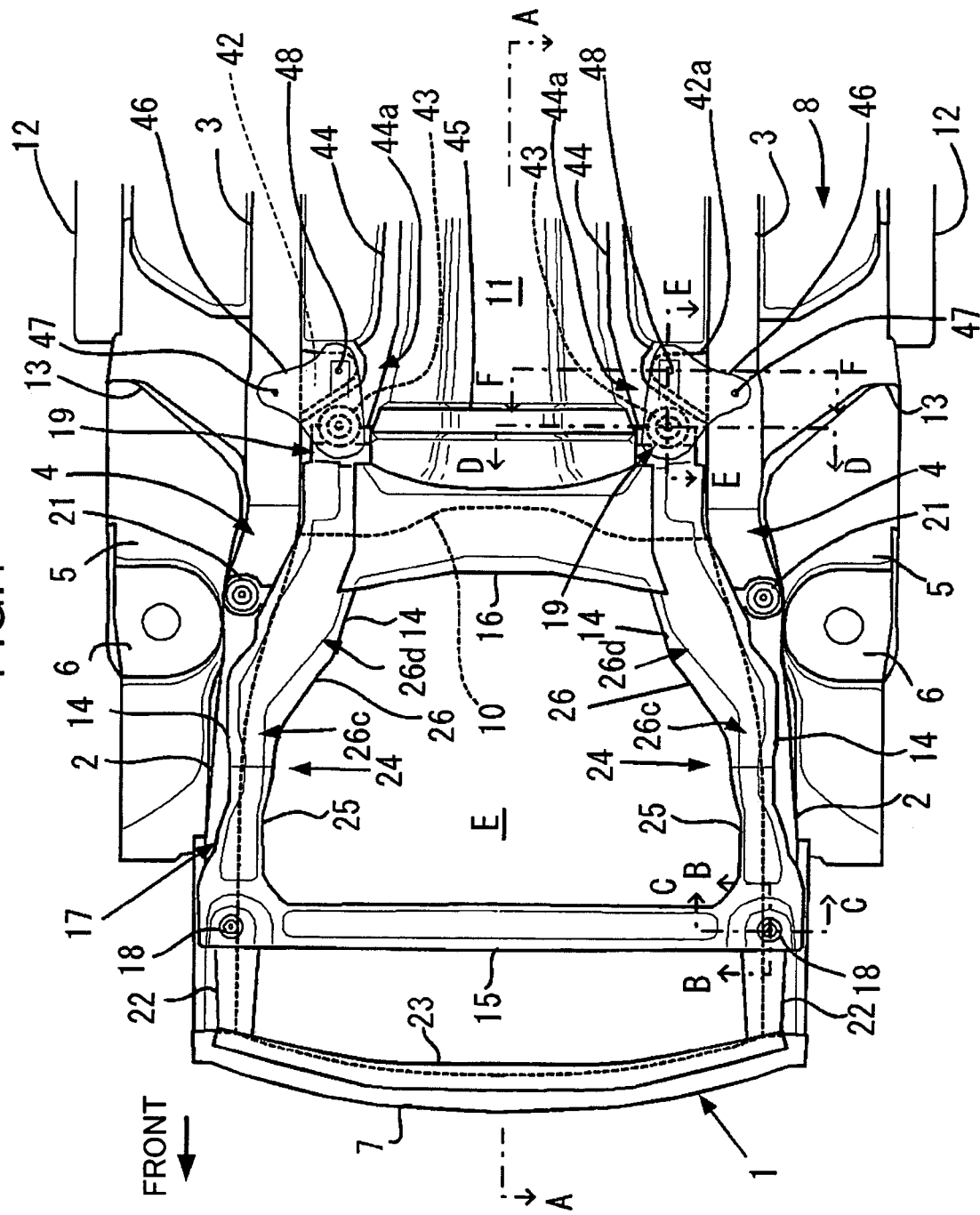
FIG. 1 is a plan view, seen from the bottom surface of a vehicle, of a front sub-frame 17, a vehicle-body frame 1, and the like, according to an embodiment of the present invention.
Figure 2:
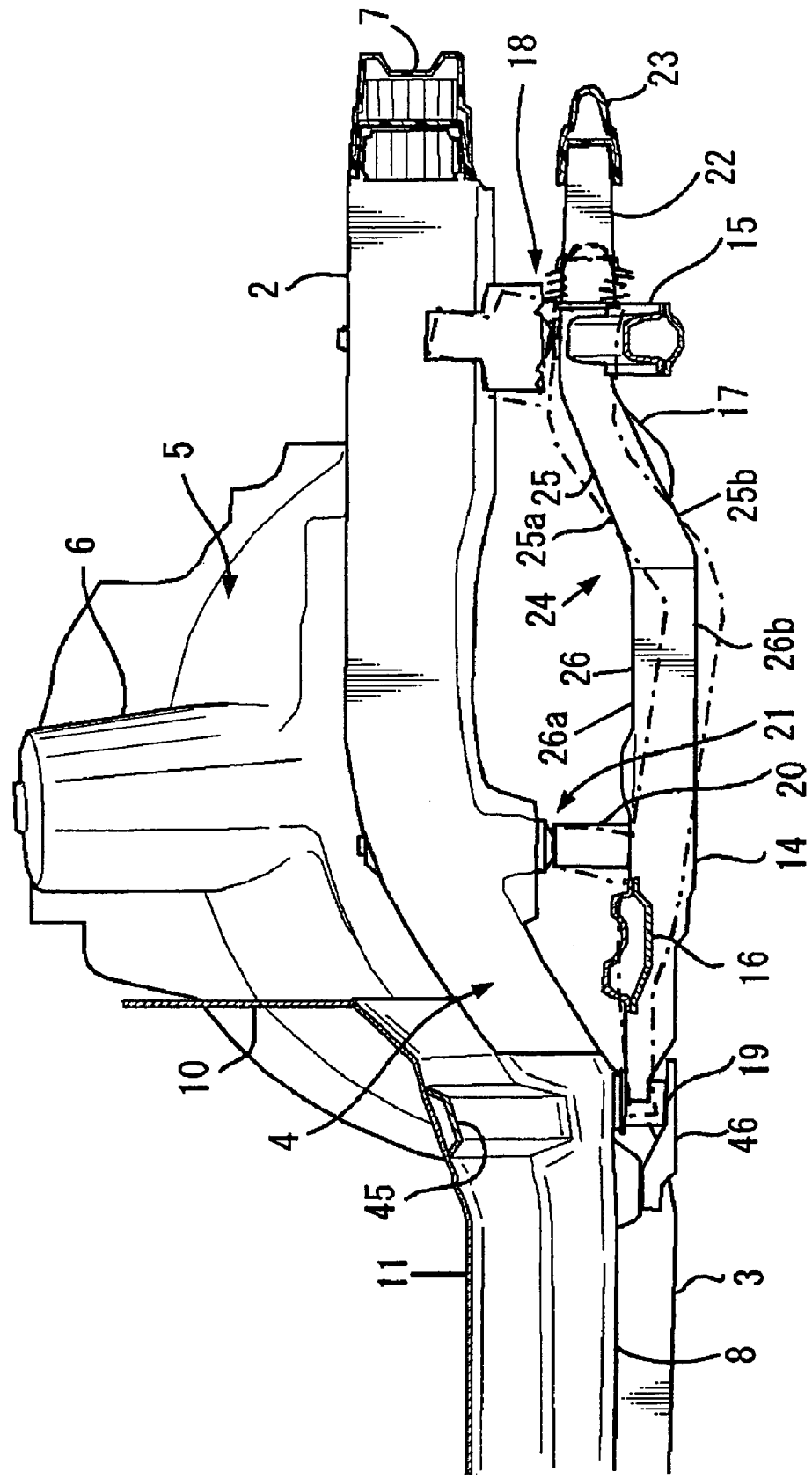
FIG. 2 is a sectional view, seen along an A—A line of FIG. 1.
Figure 3:
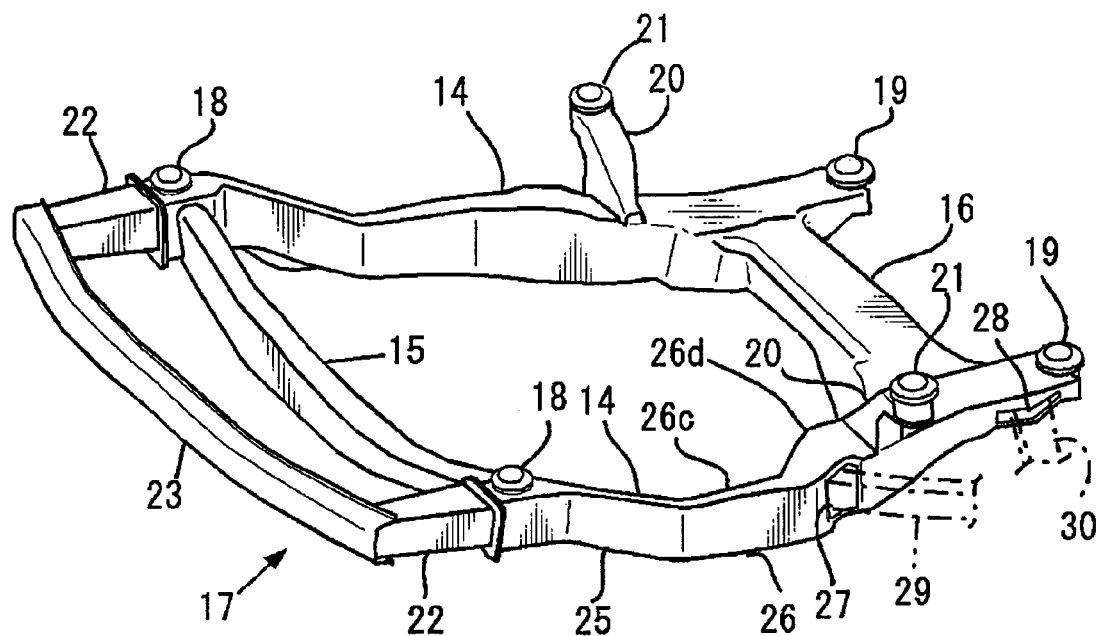
FIG. 3 is a perspective view of only the front sub-frame 17, seen obliquely from forward.
Figure 4:
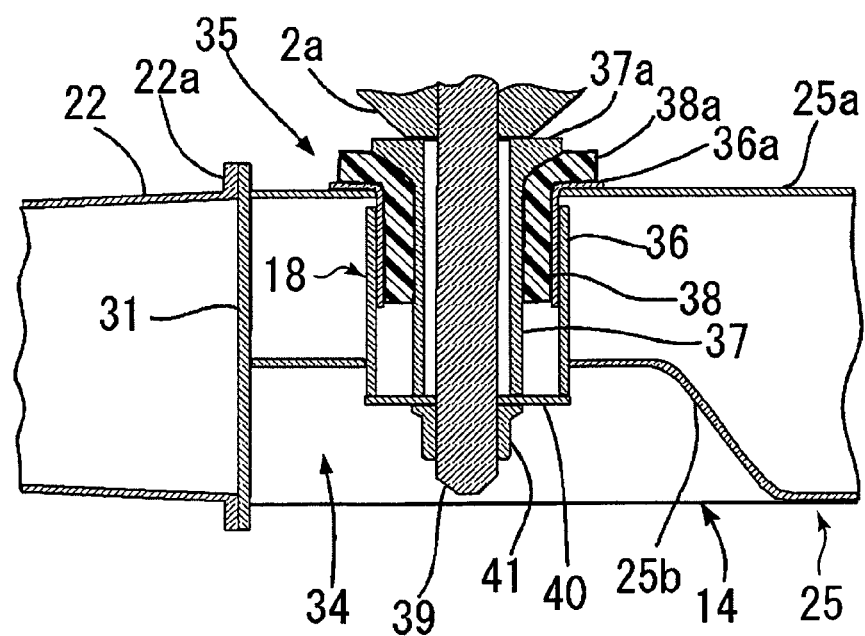
FIG. 4 is a sectional view, seen along a B—B line of FIG. 1.
Figure 5:
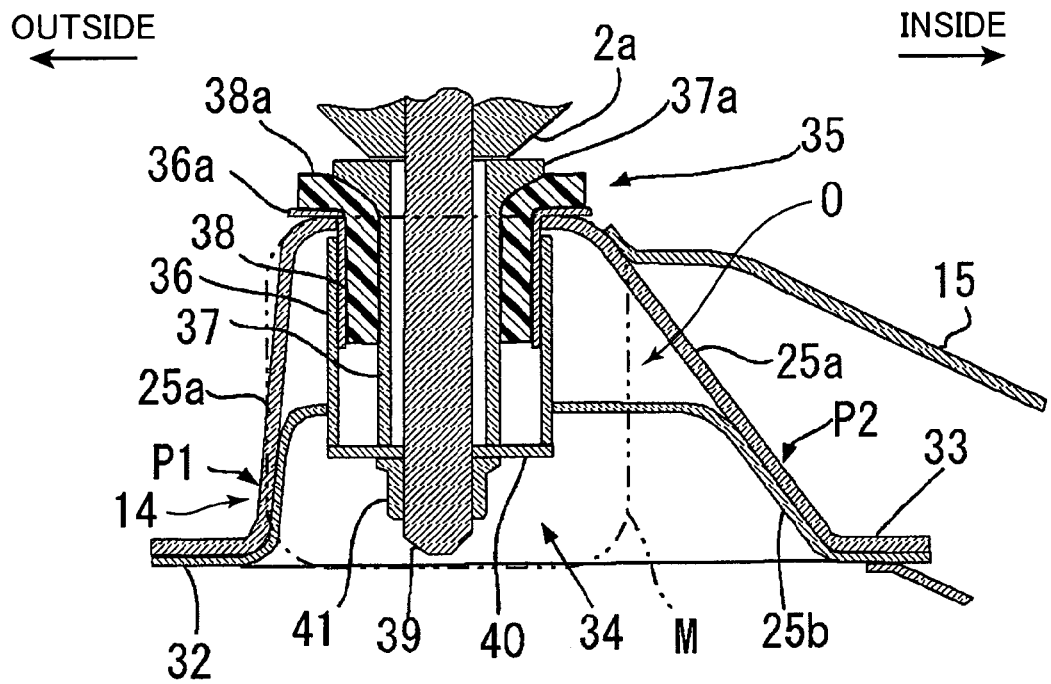
FIG. 5 is a sectional view, seen along a C—C line of FIG. 1.
Figure 6:
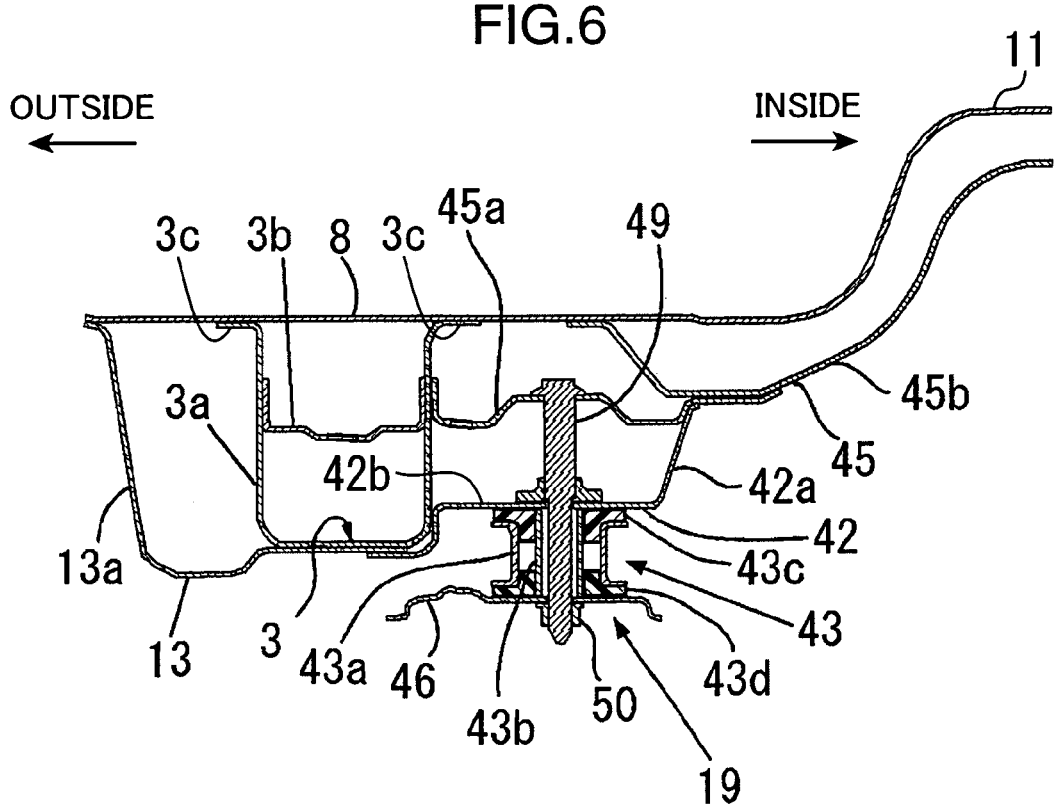
FIG. 6 is a sectional view, seen along a D—D line of FIG. 1.
Figure 7:
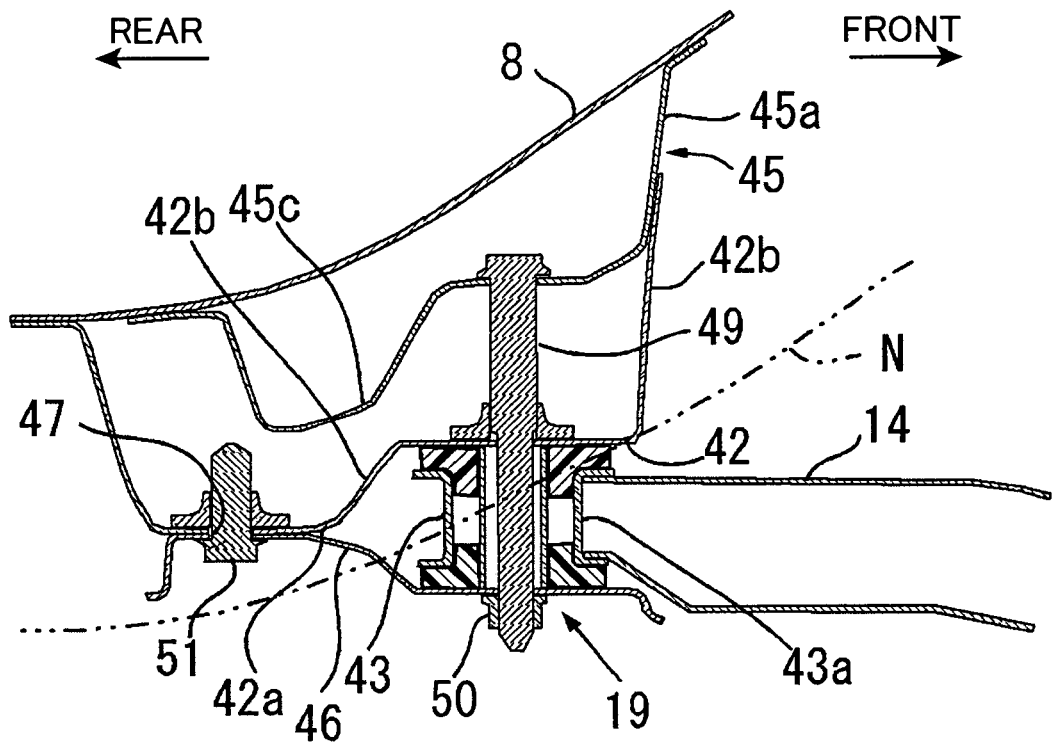
FIG. 7 is a sectional view, seen along an E—E line of FIG. 1.
Figure 8:
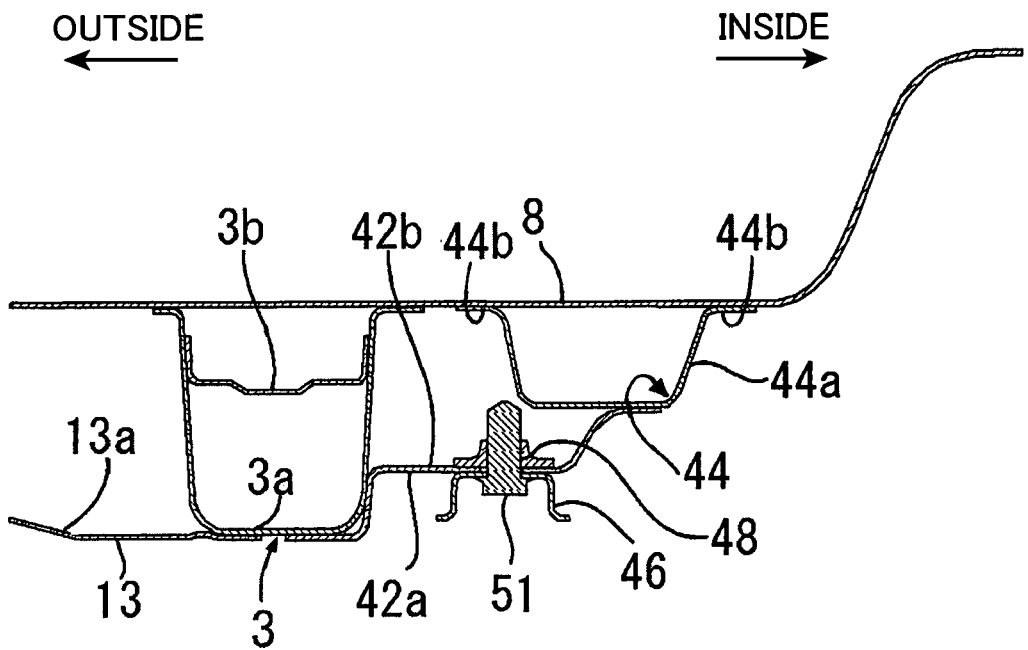
FIG. 8 is a sectional view, seen along an F—F line of FIG. 1.

FIG. 1 is a plan view, seen from the bottom surface of a vehicle, of a front sub-frame, a vehicle-body frame, and the like, according to an embodiment of the present invention. FIG. 2 is a sectional view, seen along an A—A line of FIG. 1. FIG. 3 is a perspective view of only the front sub-frame, seen obliquely from forward. FIG. 4 is a sectional view, seen along a B—B line of FIG. 1. FIG. 5 is a sectional view, seen along a C—C line of FIG. 1. FIG. 6 is a sectional view, seen along a D—D line of FIG. 1. FIG. 7 is a sectional view, seen along an E—E line of FIG. 1. FIG. 8 is a sectional view, seen along an F—F line of FIG. 1.

As shown in FIG. 1 and FIG. 2, a vehicle-body frame 1 includes: a pair of right and left front side frames 2, 2 which extend in the front-and-rear directions of a vehicle; and floor frames 3, 3 which are connected to the front side frames 2, 2 behind the front side frames 2, 2. Herein, in the rear parts of the front side frames 2, 2, kick-up portions 4, 4 are formed which incline backward and downward. Thereby, the front-end parts of the front side frames 2, 2 are each located in the position which is somewhat higher than each floor frame 3, 3.

Near the middle parts of the front side frames 2, 2, wheel housings 5, 5 are formed which are adjacent to the outside of the vehicle and house front wheels (not shown). Near their centers, suspension towers 6, 6 for housing shock absorbers which support the front wheels are formed so as to be upended upward.

At the front-end parts of the front side frames 2, 2, a steel-made bumper frame 7, which bridges their front parts extends in the vehicle-width directions. Inside of the bumper frame 7, a shock absorbing member is provided. Herein, a so-called cross member is not provided in the front side frames 2, 2, according to this embodiment. In addition, an engine (not shown) is mounted in an engine room E, which is formed to be sandwiched between the front side frames 2, 2.

A floor panel 8 is provided to cover the floor frame 3, 3 from above. Near the front-end part of the floor panel 8, a dash panel 10 is provided which extends so that its front part is located upward from the height of its rear part, and whose front-end part extends vertically and upward. This dash panel 10 partitions the space of the vehicle's front body into the engine room E and a vehicle compartment 9. In addition, in the middle part of the floor panel 8 in the vehicle-width directions, a tunnel portion 11 is formed which rises upward. In the tunnel portion 11, there is housed an exhaust pipe (not shown) of the engine, a drive shaft in a so-called FR-type vehicle, or the like.

Near the end parts of the floor panel 8 in the vehicle-width directions, side sills 12, 12 are disposed which each have a rectangular section in the vehicle-width directions. The front-end parts of the floor frame 3, 3 and the side sills 12, 12 are connected via connection frames 13, 13 which rise below the floor panel 8. Thereby, an impact load from ahead of the vehicle body branches partly from the floor frame 3, 3 so as to come into the side sills 12, 12.

Below the front side frames 2, 2, a front sub-frame 17 is disposed. This front sub-frame 17 includes a front sub-frame main-body which has: a pair of right and left side frames 14, 14 which extends in the front-and-rear directions of the vehicle; and a front cross member 15 and a rear cross member 16 which are extended and fixed in the width directions of the vehicle so that they bridge both front-end parts and both rear-end parts of the side frames 14, 14, respectively.

In the front-end parts of the side frames 14, 14, front support portions 18, 18 are formed, and in their rear-end parts, rear support portions 19, 19 are formed. Besides, in their middle parts a little ahead of the rear cross member 16, longitudinal members 20, 20 extend upward from the upper surfaces of the side frames 14, 14. At its front end, there are formed middle support portions 21, 21. The above described support portions 18, 19, 21 are each supported via a rubber bush on the lower surfaces of the front side frames 2, 2 which are located right above them. Thereby, the front sub-frame 17 is supported at the total six points on the front side frames 2, 2.

Herein, according to the present invention, the side frames 14, 14 should be not necessarily supported on the front side frames 2, 2. They may also be supported on any structural body, which forms the vehicle-body frame 1.

In the front-end parts of the side frames 14, 14, crush pipes 22, 22 (which correspond to the "impact absorbing members" described in the claims) are provided which are contracted and then crushed due to an impact load in the front-and-rear directions of the vehicle so that it can absorb the impact energy. On the front-end parts of these crush pipes 22, 22, a reinforcement 23 is fixed which extends in the width directions of the vehicle so as to bridge their front-end parts. The crush pipes 22, 22 are made of steel and shaped like a pipe so that its inside is hollow. These crush pipes 22, 22 and the steel-made reinforcement 23 are united, and are attached, by means of a fastening such as a bolt, to the above described front sub-frame main-body so that they can be attached and detached. In addition, the steel-made reinforcement 23 is placed substantially below and slightly behind the above described bumper frame 7.

Bending facilitation portions 24, 24 are formed from behind the front support portions 18, 18 of the side frames 14, 14 to the part where the longitudinal members 20, 20 are placed.

The bending facilitation portions 24, 24 are formed by: front portions 25, 25 which incline rearward and downward (i.e., whose rear parts extend downward); and rear portions 26, 26 which extend backward substantially horizontally. Herein, the rear portions 26, 26 may also incline backward at a narrower angle than the angle of the front portions 25, 25 to the horizontal plane, or incline so that the angle at which the rear portions 26, 26 incline becomes a minus value, in other words, so that its rear parts extend upward.

The side frames 14, 14 are formed by superimposing the two panels which have substantially the same shape as each other in bottom view, or an upper panel, which has a convex section and a lower panel which has a concave section. However, an upper panel 25a and a lower panel 25b which form each front portion 25, 25 is designed to be thicker than an upper panel 26a and a lower panel 26b which form each rear portion 26, 26. Thereby, the bending strength of the front portions 25, 25 in the up-and-down directions becomes greater than the bending strength of the rear portions 26, 26 in the up-and-down directions.

Herein, at least one of the upper panel 26a and the lower panel 26b of each rear portion 26, 26 may also be molded out of a softer material than the material of at least one of the upper panel 25a and the lower panel 25b of each front portion 25, 25. Thereby, the bending strength of the front portions 25, 25 in the up-and-down directions becomes greater than the bending strength of the rear portions 26, 26 in the up-and-down directions.

In the rear portions 26, 26 of the side frames 14, 14, rear-portion front parts 26c, 26c are formed to be narrower (in the vehicle-width directions, if seen from the bottom) than rear-portion rear parts 26d, 26d. Herein, the rear-portion front parts 26c, 26c are positioned, from the front-end parts of the rear portions 26, 26 which are connected to the front portions 25, 25, up to the parts a predetermined distance behind the front-end parts. On the other hand, the rear-portion rear parts 26d, 26d are positioned, from behind the rear-portion front parts 26c, 26c, up to the base parts of the longitudinal members 20, 20. Besides, in the side frames 14,14, the part from the base part of the longitudinal member 20 up to its rear-end part is formed to be substantially wider than the rear-portion front parts 26c, 26c of the front-end parts of the rear portions 26, 26.

In this embodiment, to the side frames 14,14 of the front sub-frame 17, two lower arms 29, 30 of a suspension mechanism are connected so as to sway.

Specifically, as shown in FIG. 3, in the vehicle-outside parts of the rear-portion rear parts 26d, 26d of the side frames 14, 14, a front lower-arm support portion 27 is formed, and in the vehicle-outside parts of the side frames 14, 14 behind the longitudinal members 20, 20, a rear lower-arm support portion 28 is formed. To the front lower-arm support portion 27 and the rear lower-arm support portion 28, the front lower arm 29 and the rear lower arm 30 are connected toward the vehicle outside, so that they can sway. Each outside end of these front lower arm 29 and rear lower arm 30 is connected to a wheel support (not shown) which directly supports a front wheel, so that they can sway. In addition, though it is not shown in any figure, an upper arm, which is connected to the front side frames 2, 2 is also connected to the wheel support. These configurations form the suspension mechanism.

Herein, according to the present invention, the front lower arm 29 is separated from the rear lower arm 30. However, the lower arm may also be a so-called A-type lower arm. In that case, the front lower arm 29 and the rear lower arm 30 are fixed on the outside of a vehicle.

(The operation and advantages according to the configuration of the front sub-frame 17)

The above described configuration of the front sub-frame 17 will offer the following operation and advantages.

First, in the case where a vehicle bumps at its front part into a lower obstacle, or in another such case, the impact load which is given from the obstacle comes into the reinforcement 23 and the crush pipes 22, 22. Then, they are compressed and contracted in the front-and-rear directions (refer to a chain line in FIG. 2). Thereby, some of the impact energy is absorbed, thus reducing the impact load to some extent. In addition, the reinforcement 23 extends in the vehicle-width directions so as to bridge the front ends of the crush pipes 22, 22. Therefore, even if only the middle parts of the crush pipes 22, 22 hit against the obstacle, the impact load can be transmitted to the crush pipes 22, 22. This makes it possible to lighten the impact load.

At the time of an extremely-light bump in which an impact load is extremely light, the front side frame 2 and the front sub-frame 17 are not deformed. In other words, only the bumper frame 7 is deformed, so that the impact energy can be absorbed. This makes it easy to do repairs only by replacing this bumper frame 7. In addition, at the time of a light bump in which an impact load is slightly heavier than that of this extremely-light bump, the front side frame 2 and the front sub-frame 17 are not deformed. In other words, only the bumper frame 7 and the front parts of the crush pipes 22, 22 are deformed, so that the impact energy can be absorbed. Therefore, repairs can be down only by replacing the bumper frame 7, and the crush pipes 22, 22 and the reinforcement 23 which are attached to the front sub-frame 17 so that they can be attached and detached.

However, if a vehicle crashes and thus an impact load is heavy, some of the impact energy could not be absorbed by the crush pipes 22, 22 and the reinforcement 23. In that case, the impact load whose impact energy has not been absorbed comes, from front to back along substantially the front-and-rear directions, into the side frames 14, 14 of the front sub-frame 17. At this time, by the function of the front support portions 18, 18 and the middle support portions 21, 21 of the side frames 14, 14, as well as by the function of the front portions 25, 25 and the rear portions 26, 26 of the bending facilitation portions 24, 24, the side frames 14, 14 are actively bent downward around the bending facilitation portions 24, 24. Thereby, the impact energy is absorbed, thus reducing the impact load.

Specifically, the side frames 14,14 are connected and supported to the front side frames 2, 2 with the front support portions 18, 18 and the middle support portions 21, 21. Besides, the front portions 25, 25 of the bending facilitation portions 24, 24 incline rearward and downward (i.e., their rear parts extend downward), while the rear portions 26, 26 are substantially horizontal.

Accordingly, by the impact load which has inputted from the front ends of the side frames 14, 14, the front-end parts of the side frames 14, 14 are displaced backward, without largely moving down and at substantially the same height. On the other hand, the middle support portions 21, 21 of the side frames 14, 14 are securely connected, via the longitudinal members 20, 20, to the front side frames 2, 2. Therefore, a moment works around a bending portion which is formed on the boundary between the front portions 25, 25 and the rear portions 26, 26 of the bending facilitation portions 24, 24. Thereby, the front portions 25, 25 and the rear portions 26, 26 are bent substantially around the bending portion so that they are, as a whole, displaced downward with the front-end parts of the front portion 25 being directed upward.

In addition, as described above, even if the bending facilitation portions 24, 24 are bent downward, the side frames 14,14 cannot come into contact and interfere with the lower surfaces of the front side frames 2, 2. Hence, the front side frames 2, 2 are prevented from being largely damaged. Therefore, even though the side frames 14,14 are bent so that the distance becomes shorter between the front support portions 18, 18 and the middle support portions 21, 21 of the side frames 14,14, then the front side frames 2, 2 to which the front support portions 18,18 and the middle support portions 21, 21 are connected and supported cannot be destroyed, as described above. Thus, they can be kept rigid in the front-and-rear directions. Therefore, when the side frames 14, 14 are bent right after a vehicle has bumped, the front side frames 2, 2 cannot be deformed and destroyed at one stretch. Hence, the front side frames 2, 2 can efficiently absorb the impact energy over the entire period of the bump. This makes it possible to reduce the impact load largely, despite such a simple configuration.

In this case, as described above, the impact load comes into the side frames 14,14 with kept lighter to some extent by the crush pipes 22, 22 and the reinforcement 23. Therefore, a part of the impact load is transferred to the front side frames 2, 2 so that the front side frames 2, 2 which are very rigid can easily absorb the impact energy sufficiently. Thus, as a whole, more impact energy can be absorbed.

Furthermore, in this embodiment, the thickness, material or the like of the front portions 25, 25 and the rear portions 26, 26 of the bending facilitation portions 24, 24 are adjusted. Thus, the up-and-down bending strength of the front portions 25, 25 in the front-and-rear directions is designed to be greater than that of the rear portions 26, 26.

Thereby, when the bending facilitation portions 24, 24 are bent, the front portions 25, 25 are kept from being broken. This helps certainly bend the bending facilitation portions 24, 24 downward.

Moreover, in the rear portions 26, 26 of the side frames 14,14, the rear-portion front parts 26c, 26c are formed to be narrower than the rear-portion rear parts 26d, 26d. Hence, they have a width-extended portion which is wider than the front portions 25, 25, and a narrow portion which is formed in a front position that is the boundary between the narrow portion and the front portions 25, 25 and is narrower than the width-extended portion. Therefore, if the bending facilitation portions 24, 24 are bent downward, then the support structure of the side frames 14, 14 and the middle support portions 21, 21, and its vicinity, can be prevented from being largely deformed. Thus, the connection of the side frames 14,14 and the middle support portions 21, 21 can be kept from becoming weaker. This helps certainly bend the bending facilitation portions 24, 24.

As described above, the front part of a vehicle can certainly absorb more impact energy.

(A detailed structure of the front support portions 18, 18 of the side frames 14, 14)

Next, the front support portions 18, 18 of the side frames 14, 14 will be described with reference to FIG. 4 and FIG. 5.

As shown in FIG. 4, a flange portion 22a of the rear-end part of the crush pipe 22 is attached to a front-end wall 31 which covers the front-end surface of the side frame 14, so that it can be attached and detached. In the front-end part of the side frame 14, the upper panel 25a and the lower panel 25b of the front portion 25 are superimposed and formed by a flange joint (described later). In this case, the upper panel 25a is thicker than the lower panel 25b.

In the front-end part of this upper panel 25a, its middle part in the vehicle-width directions is fixed to the front-end wall 31, by means of welding or the like. On the other hand, the front-end part of the lower panel 25b is formed so that its middle part (which corresponds to the bottom wall near the front-end part of the side frame 14) in the vehicle-width directions is lifted up in a convex shape as it extends forward. With kept elevated like this, this front-end part is fixed by means of welding to the front-end wall 31.

As shown in FIG. 5, in the part on the vehicle outside of the front-end part of the side frame 14, the end part in the vehicle-width directions on the upper surface of the side frame 14 of the upper panel 25a extends largely downward, up to substantially the height of the lower surface of the side frame 14 as it shifts toward the vehicle outside. Then, it extends substantially horizontally toward the outside of the side frame 14 in the vehicle-width directions, near substantially the lower-surface height of the side frame 14.

Furthermore, on the vehicle outside, the end part in the vehicle-width directions of the above described lifted-up part in the middle part of the lower panel 25b in the vehicle-width directions extends downward along the upper panel 25a which extends downward, up to substantially the lower-surface height of the side frame 14. In this case, the lower panel 25b and the upper panel 25a are superimposed. The lower panel 25b extends substantially horizontally toward the outside of the side frame 14 in the vehicle-width directions, near substantially the lower-surface height of the side frame 14. In this way, in the part on the vehicle outside of the front-end part of the side frame 14, the upper panel 25a and the lower panel 25b which are superimposed each other are joined. Therefore, a substantially-flat flange portion 32 is formed which extends on the vehicle outside over the front-and-rear directions of the vehicle.

Similarly, even in the part on the vehicle inside of the front-end part of the side frame 14, the end part in the vehicle-width directions on the upper surface of the side frame 14 of the upper panel 25a extends downward, up to substantially the height of the lower surface of the side frame 14 as it shifts toward the vehicle inside. Then, it extends substantially horizontally toward the outside of the side frame 14 in the vehicle-width directions, near substantially the lower-surface height of the side frame 14. Herein. The inclination degree at which the upper panel 25a extends downward is lesser than that on the vehicle outside.

Moreover, in the same way, with respect to the lower panel 25b, in the part on the vehicle inside of the front-end part of the side frame 14, the end part in the vehicle-width directions of the lifted-up part of the lower panel 25b extends downward along the gently-inclined upper panel 25a which extends downward, up to substantially the lower-surface height of the side frame 14. Then, the lower panel 25b and the upper panel 25a are superimposed so that the former extends downward. The lower panel 25b extends substantially horizontally toward the inside of the side frame 14 in the vehicle-width directions, near substantially the lower-surface height of the side frame 14. In this way, even on the vehicle inside, the upper panel 25a and the lower panel 25b, which are superimposed each other are joined. Therefore, a substantially-flat flange portion 33 is formed which extends on the vehicle inside over the front-and-rear directions of the vehicle.

Herein, in the flange portion 32 and the flange portion 33, the upper panel 25a and the lower panel 25b are joined together by means of welding (i.e., a flange joint).

In addition, on the vehicle inside, the upper surface and the lower surface of the end part of the front cross member 15 are joined to the part near the upper surface of the side frame 14 and the flange portion 33, respectively.

According to this configuration, in the section in the vehicle-width directions, there are formed: a closed section O which is enclosed with the upper part of the upper panel 25a and the upper surface of the lower panel 25b; and lower side-wall surfaces P1, P2 which extend downward from both end parts of this closed section O in the vehicle-width directions, up to near the lower-surface height of the crush pipe 22. Herein, the lower side-wall surfaces P1, P2 are formed by superimposing the lower part (which corresponds to the exterior wall of the side frame 14) of the upper panel 25a and the side wall of the lower panel 25b (see FIG. 5).

In FIG. 5, a chain double-dashed line M denotes the outline of the rear-end part right in front of the flange portion 22a in the crush pipe 22.

According to this, the flange portion 32 and the flange portion 33, and the crush pipe 22, are placed close to each other, so that the former are located at substantially the same height as that of the lower surface of the rear-end part of the latter.

Moreover, the outside side wall of the side frame 14 which is formed by the downward extension of the upper panel 25a on the vehicle outside from the side frame 14 is joined to the above described front-end wall 31, so that it is located, if seen in the front-and-rear directions of the vehicle, to substantially overlap with the side wall on the vehicle outside of the crush pipe 22.

Furthermore, the side wall on the inside of the side frame 14 which is formed by the gentle downward extension of the upper panel 25a on the vehicle inside from the side frame 14 inclines steeply, so that the forwarder it extends from here, the closer the section in the vehicle-width directions of the side frame 14 comes to a rectangular shape, if seen in the front-and-rear directions of the vehicle. Then, it is joined to the front-end wall 31 so as to substantially overlap with the side wall on the vehicle inside of the crush pipe 22.

At the part, which is surrounded with the flange portion 32 and the flange portion 33 and where the lower panel 25b rises up, a hollow portion 34 is formed which has a hollow shape in bottom view.

An in-and-out cylindrical rubber bush 35 is provided as the front support portion 18, so as to penetrate the hollow portion 34 by this lower panel 25b and the upper panel 25a, which is located above this hollow portion 34.

Next, this rubber bush 35 will be described in detail. The rubber bush 35 is provided with: a steel-made exterior cylindrical portion 36 which is joined to the upper panel 25a and the lower panel 25b so as to pass through the hollow portion 34 from the upper surface of the side frame 14; and an interior cylindrical portion 37 whose diameter is narrower than that of the exterior cylindrical portion 36. They are placed concentric. In both the exterior cylindrical portion 36 and the interior cylindrical portion 37, their upsides extend above the upper surface of the side frame 14. At the end parts of these extending upper parts, there are formed an upper-end peripheral portion 36a and an upper-end peripheral portion 37a, respectively, which extend substantially horizontally in the peripheral directions. In this case, the upper-end peripheral portion 36a of the exterior cylindrical portion 36 is located below the upper-end peripheral portion 37a of the interior cylindrical portion 37.

A cylindrical rubber 38 is fit and inserted into the space which is surrounded with the exterior cylindrical portion 36 and the interior cylindrical portion 37. This rubber 38 extends so that an upper-end peripheral portion 38a of the rubber 38, which extends on the peripheral side is fit and inserted, on the upside, into the space which is surrounded with the upper-end peripheral portion 37a of the interior cylindrical portion 37 and the upper-end peripheral portion 36a of the exterior cylindrical portion 36.

On the other hand, the lower-end side of the rubber 38 is put in a substantially-middle position between the height of the upper surface of the side frame 14 and the height of the hollow portion 34.

A bolt 39 is provided as an attachment member for this rubber bush 35. It is fixed to a front-end portion 2a of the front side frame 2, and extends downward from this front-end portion 2a. This bolt 39 is fit and inserted into the inside of the interior cylindrical portion 37 of the rubber bush 35. Then, a nut 41 is screwed below the bolt 39 which allows the lower end of the front-end portion 2a to come into contact with the upper-end part of the interior cylindrical portion 37, and allows washer-ring 40 which is placed below the exterior cylindrical portion 36 and the interior cylindrical portion 37 to come into contact with the lower-end parts of the exterior cylindrical portion 36 and the interior cylindrical portion 37, respectively.

(The operation and advantages according to the structure of the front support portion 18 of the side frame 14)

The above described structure of the front support portion 18 will offer the following operation and advantages.

In short, in order to heighten fuel efficiency, it is generally important to make a vehicle lighter. This is also applied for the rubber bush 35.

In this embodiment, the side frame 14 needs to be securely fixed so that it can resist an impact load from ahead. However, the side frame 14 itself is firmly fixed to the front side frame 2 by the middle support portion 21 and the rear support portion 19. Thus, a vibration, a load, or the like, cannot be largely inputted in the front side frame 2, through the rubber bush 35, from the front support portion 18 of the side frame 14. Besides, the front-end part of the side frame 14 is provided only with the light crush pipe 22 and the like, and thus, this part is relatively light. Accordingly, there is no need to support the side frame 14, on a large scale, to the front side frame 2 by the front support portion 18. Hence, this embodiment aims at making the rubber bush 35 far lighter.

In order to make the rubber bush 35 lighter, it should be made smaller. In other words, taking a reduction in its vibration into account, the rubber bush 35 needs to be smaller, specifically, the exterior cylindrical portion 36, the interior cylindrical portion 37 and the rubber 38 have to be shortened in the up-and-down directions. In addition to the shortening of the exterior cylindrical portion 36, the interior cylindrical portion 37 and the rubber 38, if only the rubber 38 is made even shorter, the rubber bush 35 becomes far lighter.

However, in this way, if the rubber bush 35 becomes shorter in the up-and-down directions, the following configuration can usually be considered. The lower panel 25b right below the rubber bush 35 is not lifted up, and the hollow portion 34 according to this embodiment is not provided. In this case, in order to support the exterior cylindrical portion 36 of the rubber bush 35, a substantially-horizontal reinforcement member such as the lower panel 25b which rises according to this embodiment needs to be newly provided, separately from the lower panel 25b, in a substantially central position of the upper panel 25a and the lower panel 25b. However, if such a reinforcement member is provided, there is a disadvantage in that the productivity becomes lower.

In contrast, in this embodiment, in the front-end part of the side frame 14 and in its vicinity, in the section in the vehicle-width directions, there are formed: the substantially-rectangular closed section O in which the rubber bush 35 is provided; and the lower side-wall surfaces P1, P2 which extend from both end parts of this closed section O in the vehicle-width directions, up to near the lower-surface height of the impact absorbing member (i.e., the crush pipe 22). Then, they extend over the front-and-rear directions of the vehicle. Specifically, below the rubber bush 35, the lower panel 25b is elevated to form the hollow portion 34. This makes it possible to shorten the rubber bush 35 easily without providing a reinforcement member separately.

Besides, as described above, if the substantially-rectangular closed section O and the lower side-wall surfaces P1, P2 are provided, the front-end part of the side frame 14 and in its vicinity can be kept from becoming less rigid, which may be caused by forming the hollow portion 34 in order to shorten the rubber bush 35. This helps enhance the support rigidity of the crush pipe 22, and also helps the crush pipe 22 absorb more impact energy. In addition, the support rigidity to the vehicle-body frame 1 by the front support portion 18 can also be heightened. Therefore, when a vehicle bumps, the impact load is actively transmitted to the front side frames 2, 2. Thus, using the above described bending facilitation portion 24 or the like, the front sub-frame 17 can reduce even more impact load.

Moreover, at both ends in the vehicle-width directions, the flange portion 32 and the flange portion 33 which extend toward the outside of the side frame 14 from substantially the lower-surface height of the side frame 14 are formed along the vehicle-width directions. Therefore, using the right and left flange portions 32, 33, the part which is located right behind the crush pipe 22 and is required to be very rigid in the front-and-rear directions of the vehicle can be made more rigid, especially in the front-and-rear directions. Accordingly, as described above, even if the hollow portion 34 is provided in order to shorten the rubber bush 35, the front-end part of the side frame 14 and in its vicinity can be prevented from becoming far less rigid in the front-and-rear directions.

Furthermore, in this embodiment, the upper panel 25a is thicker than the lower panel 25b. In addition, neat the part where the hollow portion 34 of the side frame 14 is formed, the upper panel 25a is placed so as to cover, from above, a substantially entire part of the lower panel 25b. Thereby, the upper panel 25a forms an outside wall of the side frame 14, and below there, is superimposed on the lower panel 25b. According to this configuration, even though the hollow portion 34 is provided, in other words, despite the fact that the side frame 14's sectional area is reduced in the vehicle-width directions, then the side frame 14 can be kept from becoming less rigid to maintain its great rigidity as a whole. This is because, as described above, the thicker upper panel 25*a* forms the outside wall of the side frame 14.

Especially, in this embodiment, the upper panel 25*a* extends up to the lower surface of the side frame 14, with kept superimposed, at the lower part of its side wall surface, on the lower panel 25*b*. From the lower-end part of this superimposition part, the flange portions 32, 33 are formed toward the outside of the side frame 14. This makes it possible to maintain the great rigidity.

Moreover, the hollow portion 34 is formed at the part where the rubber bush 35 is provided. Therefore, using the relatively large hollow portion 34, the nut 41 can be easily screwed on the bolt 39, thus improving the screwing work.

Herein, according to the present invention, the upper panel 25*a* has to be not necessarily thicker. The upper panel 25*a* may also be as thick as, or narrower than, that of the lower panel 25*b*.

(Around the attachment structure of the rear support portion 19 of the side frame 14)

Next, the part around the attachment structure of the rear-end part of the side frames 14,14 will be described.

As shown in FIG. 1 and FIG. 6, in the floor panel 8 on the vehicle inside in the front-end parts of the floor frames 3, 3, attachment portions 42, 42 are formed adjacent to the floor frames 3, 3. The rear support portions 19, 19 of the side frames 14, 14 are connected and supported, via rubber bushes 43, 43, to these attachment portions 42, 42.

Herein, the lower surfaces of the attachment portions 42, 42 (herein, the side of the road surface is regarded as the downside) are formed to be higher than the lower surfaces of the floor frames 3, 3 which are located at least near them. For example, they are formed to be higher than the lower surfaces of the floor frames 3, 3 which incline downward as they extend backward near the part where the rear support portions 19, 19 are provided (refer to FIG. 6 and FIG. 7).

In addition, in the attachment portions 42, 42, stopper portions 42*a*, 42*a* (or protrusion portions) are formed so as to protrude downward, in a position one step behind the lower surfaces of the attachment portions 42, 42, right behind the parts where they support the rear support portions 19, 19. On the vehicle inside from these attachment portions 42, 42, branching frames 44, 44 are formed (refer to FIG. 8). They are formed by the branching of the floor frames 3, 3, and extend rearward from the attachment portions 42, 42 substantially at the same height as that of the lower surfaces of the attachment portions 42, 42. Herein, the parts (which also include the attachment portions 42, 42, according to this embodiment) where are the front-end parts of the branching frames 44, 44 and are formed by the branching of the floor frames 3, 3 are called branching portions 44*a*, 44*a*.

Furthermore, at least in the rear parts of the branching frames 44, 44, there are provided: a joint portion 42*b* which is joined to the lower surface of the floor panel 8; and a concave portion 44*a* which dents downward from the lower surface of the floor panel 8 and forms a closed section between it and the floor panel 8. Besides, the stopper portions 42*a*, 42*a* are also adjacent to the vehicle-inside part of the floor frames 3, 3. The lower surfaces of the entire part of the stopper portions 42*a*, 42*a*, or the most part which includes at least its rear part, are formed to be higher than the lower surfaces of the floor frames 3, 3 which incline downward as they extends backward (refer to FIG. 7 and FIG. 8).

On the side of the front ends of the attachment portions 42, 42 and on the side of the vehicle inside of the parts where the rear support portions 19, 19 are located, a dash cross member 45 (which corresponds to the "reinforcement frame" described in the claims) extends so as to bridge the right and left attachment portions 42, 42 in the vehicle-width directions along the tunnel portion 11. The lower surfaces of this dash cross member 45 are formed, in the part adjacent to the attachment portions 42, 42, one step above the lower surfaces of the attachment portions 42, 42 and one step below the surrounding floor panel 8.

Below: the stopper portions 42*a*, 42*a*; the parts where the floor frames 3, 3 are adjacent to the stopper portions 42*a*, 42*a*; and the rear support portions 19, 19, cover portions 46, 46 (which correspond to the "extension support portion" described in the claims) are provided so as to cover those. In the stopper portions 42*a*, 42*a*, bolt holes 47, 47 are formed as shown in FIG. 8, and bolt holes 48, 48 are formed in the floor frames 3, 3. Into these bolt holes, a bolt 51 is screwed via the cover portions 46, 46, so that the cover portions 46, 46 can be fixed. Besides, the cover portions 46, 46 support, as shown in FIG. 6, the rear support portions 19, 19, via the rubber bushes 43, 43. This prevents the rear end of the side frame 14 from falling.

Next, the attachment portion 42, the stopper portion 42*a*, and their peripheral structure will be described in detail with reference to FIG. 6 to FIG. 8.

The above described floor frame 3 includes, as shown in FIG. 6: a joint portion 3*c* which is joined to the floor panel 8 near the rear support portion 19; and a concave portion which is formed by a front frame panel 3*a* which forms a closed section between it and the floor panel 8, as the section is formed like a rectangle if seen in the front-and-rear directions of the vehicle. In its middle part in the up-and-down directions, a reinforcement 3*b* is provided which connects the side surfaces of the front frame panel 3*a* over the front-and-rear directions.

Moreover, a concave connection frame panel 13*a* is joined to the lower surface of the floor frame 3, so as to cover the lower surface of the front frame panel 3*a*. Herein, the connection frame panel 13*a* forms a connection frame 13, and has a rectangular section and a concave shape whose upper part is opened. Thereby, the floor frame 3 is reinforced and connected to the connection frame 13. Herein, near this rear support portion 19, the floor frame 3 inclines downward as it extends backward. In FIG. 6, the lower surface of the connection frame 13 is located below the lower surface of the floor frame 3.

To a substantially-central part in the up-and-down directions of the vehicle-inside side surface of the front frame panel 3*a*, there is joined the vehicle-outside end part of a dash-cross end-part panel 45*a*. To the part on the downside of the inside side surface of the front frame panel 3*a*, the end part on the vehicle-outside of an attachment-part panel 42*b* which forms the attachment portion 42 is joined in a position slightly higher than the lower surface of the front frame panel 3*a*.

In addition, on the vehicle inside of the dash-cross end-part panel 45*a*, a dash-cross member panel 45*b* which forms the dash cross member 45 toward the vehicle central part is joined to the floor panel 8. In this case, to the lower surface of the vehicle-outside side part of this dash-cross member panel 45*b*, the end part on the inside of the dash-cross end-part panel 45*a* and the end part on the inside of the attachment portion 42 are joined and fixed so as to overlap each other. Thereby, the attachment portion 42 and the end part of the dash cross member 45 are reinforced. In short, the dash-cross member panel 45*b* which forms the dash-cross end-part panel 45*a* and the dash cross member 45 links the right and left attachment portions 42, 42. It also forms a reinforcement frame which makes up the closed section which is joined to the floor panel 8 and extends in the vehicle-width directions.

To the dash-cross end-part panel 45*a*, the shaft tip part of a bolt 49 is fixed downward. The shaft tip part of the bolt 49 penetrates the attachment-part panel 42*b* and a cover portion 46 which are located below it. Then, it extends further downward. The rubber bush 43 of the rear support portion 19 of the side frame 14 is an in-and-out cylindrical type. Between an exterior cylinder 43*a* (refer to FIG. 7) and an interior cylinder 43*b* which are joined to the rear end of the side frame 14, there are fit and inserted an upper rubber 43*c* and a lower rubber 43*d* which have a ring shape. The upper-end part of the upper rubber 43*c* is in contact with the lower surface of the attachment-part panel 42*b*. On the other hand, the lower-end part of the lower rubber 43*d* is in contact with the upper surface of the cover portion 46.

A nut 50 is screwed on the bolt 49 which penetrates the cover portion 46. Thereby, between the cover portion 46 and the attachment-part panel 42*b*, the rubber bush 43 which includes the upper rubber 43*c* and the lower rubber 43*d* is placed. Thus, the rear-end part of the side frame 14 is fixed to the attachment portion 42, so that it can reduce a vibration.

FIG. 7 is a sectional view of the rear support portion 19 and its vicinity, seen from the vehicle-body side. In this figure, the floor panel 8 inclines downward as it extends from front to back. Along this, the lower surface (i.e., a chain double-dashed line N) of the floor frame 3 also inclines, in the same way, in the position a predetermined distance apart downward from the floor panel 8. The dash-cross end-part panel 45*a* is joined to the part where the floor panel 8 inclines. In the rear part of the dash-cross end-part panel 45*a*, a dash-cross end-part extension portion 45*c* extends, so that the end part of the dash cross member 45 is reinforced.

In the attachment-part panel 42*b*, its front end is joined to the front end of the dash-cross end-part panel 45*a*. Then, it rises downward as it extends backward, so that the attachment portion 42 is formed. Further, it is continuously lifted up downward from the rear end of the lower surface of the attachment portion 42, so that the stopper portion 42*a* is formed. The rear end of the stopper portion 42*a* extends upward and is joined to the floor panel 8.

In this way, the attachment portion 42 and the stopper portion 42*a* are formed by the attachment-part panel 42*b*. This heightens their connection rigidity.

The cover portion 46 inclines upward as it extends backward from near the rear support portion 19. Then, it is in contact with the lower surface of the attachment-part panel 42*b* which forms the stopper portion 42*a*. In this contact part, the bolt 51 is screwed, via the cover portion 46, the part where the bolt hole 47 is formed. Thereby, the cover portion 46 and the lower surface of the stopper portion 42*a* are screwed and fixed.

As described above, the rear support portion 19, in other words, the upper part of the rubber bush 43, is connected to the stopper portion 42*a*, by the continuous attachment-part panel 42*b* which extends downward as it stretches rearward. On the other hand, the lower part of the rubber bush 43 is connected to the stopper portion 42*a*, by the continuous cover portion 46 which extends upward as it stretches rearward. This strengthens the connection rigidity of the rear-end part of the side frame 14 and the stopper portion 42*a*.

FIG. 8 is a sectional view of the position where the bolt 51 is screwed and its vicinity, seen in the front-and-rear directions of the vehicle. In this figure, the floor frame 3 is formed by the front frame panel 3*a* and the reinforcement 3*b*, and the connection frame 13 is formed by the connection frame panel 13*a*. This is substantially the same as that of FIG. 6.

To the lower part of the vehicle-inside side surface of the front frame panel 3*a*, the vehicle-outside end part of the attachment-part panel 42*b* which forms the stopper portion 42*a* is joined slightly above the lower surface of the front frame panel 3*a*, so that it covers substantially the half of the lower surface of the floor frame 3 in the vehicle-width directions.

In addition, to the floor panel 8 which stays in the position a predetermined distance apart from the floor frame 3 toward the inside in the vehicle-width directions, there is fixed a branching frame panel 44*a* which extends rearward from the attachment portion 42 and forms the branching frame 44.

The inside end part of the attachment-part panel 42*b* in the vehicle-width directions which forms the above described stopper portion 42*a* is joined so as to cover the lower surface of the branching frame panel 44*a*.

According to this configuration, the stopper portion 42*a* can be rigidly connected to both the floor frame 3 and the branching frame 44.

(The operation and advantages in the attachment structure of the rear support portion 19 of the side frame 14 and its peripheral structure)

According to the above described configuration, the stopper portion 42*a* is placed right behind the rear support portion 19 of the side frame 14. Therefore, when a vehicle bumps at its front part, a heavy impact load works, from front to back, on the side frame 14. Then, the impact load which is directed backward is transmitted to the attachment portion 42 from the rear support portion 19. Next, this impact load is transferred to the stopper portion 42*a*. At this time, the stopper portion 42*a* can disperse the impact load to the branching frame 44 and the floor frame 3. This is because the stopper portion 42*a* is strongly connected by the branching frame 44 and the floor frame 3. Therefore, the impact energy can be dispersed and transferred. This certainly keeps the side frame 14 from moving back, in other words, the front sub-frame 17 from retreating. As a result, the vehicle-body front part can be prevented from being destroyed as much as possible.

Further, the stopper portion 42*a* is formed so that its lower surface is higher than the lower surface of the floor frame 3 adjacent to it, in other words, the lower surface of the floor frame 3 which is located near the branching portion 44*a*, and so that it is lower than the lower surface of the attachment portion 42. Therefore, in the case where the stopper portion 42*a* or its vicinity comes into contact with an elevated place of the road surface while an automobile is running, the stopper portion 42*a* can be prevented from coming into contact directly with the road surface. This largely reduces the frequency of situations in which the stopper portion 42*a* is broken. Hence, the possibility can be reduced to the utmost that a bump will take place at a vehicle's front part in a state where the support rigidity is deteriorated in the rear support portion 19 which is supported on the stopper portion 42*a*. This makes it possible both to absorb more impact energy and to certainly keep the front sub-frame 17 from retreating.

Moreover, the right and left attachment portions 42 are also linked to the end part of the dash cross member 45 (i.e., reinforcement frame) which is formed to realize a great rigidity. Therefore, when a vehicle bumps at its front part, the impact load which works on the side frame 14 is transmitted to the dash cross member 45, and via this, also to the floor frame 3 on the opposite side in the vehicle-width directions. This makes it possible to disperse and absorb more impact energy.

Furthermore, on the vehicle outside and on the backside from the attachment portions 42 of the floor frame 3, the connection frame 13 is formed adjacent to the floor frame 3. Therefore, when a vehicle bumps at its front part, the impact load, which works on the side frame 14 is transmitted to the connection frame 13, and via this, also to the side sill 12. This makes it possible to disperse and absorb far more impact energy.

In addition, even in the case where an impact load is so heavy that the front bump actually allows the side frame 14 to move back and the rear support portion 19 to come into contact with the stopper portion 42a, the front sub-frame 17 can be kept from further retreating. As a result, the vehicle-body front part can be prevented from being destroyed.

If an automobile bumps, at its front part, into an obstacle which is substantially as high as, or higher than, the front-end part of its vehicle-body frame 1, then the impact load is transmitted to the floor frame 3, mainly via the front side frame 2, rather than via the front sub-frame 17. At this time, the floor frame can bear this transmitted impact load. This is because the stopper portion 42a is formed adjacent to the floor frame 3 so that the floor frame 3 becomes more rigid. As a result, the floor frame 3 can absorb more impact energy of the transmitted impact load. Besides, the rigid stopper portion 42a also transmits a part of the impact load which works on the floor frame 3 to the branching frame 44. This makes it possible to absorb more impact energy.

Furthermore, the attachment portion 42 is designed to be higher than the floor frame 3, which is located near it. Therefore, even in the case where the attachment portion or its vicinity comes into contact with an elevated place of the road surface while a vehicle is running, the attachment portion 42 can be prevented from coming into contact directly with the road surface and being broken. Hence, the possibility can be largely reduced that the state in which the front sub-frame 17 is kept supported on the vehicle-body frame 1 is deteriorated. Accordingly, a bump can be prevented from taking place as much as possible in a state where the attachment portion 42 is kept broken. This makes it possible to absorb more impact energy and keep the front sub-frame 17 from largely retreating.

In addition, the upper part and the lower part of the rear support portion 19 are supported between the extension support portion which is formed by the attachment portion 42 and the cover portion 46, respectively, and are rigidly connected to the stopper portion 42a. Therefore, when a vehicle bumps at its front part, the heavy rearward impact load which works on the side frame 14 is efficiently transmitted to the stopper portion 42a. As a result, as described above, more impact energy is dispersed and absorbed by the branching frame 44 and the floor frame 3.

Furthermore, the lower part of the rear support portion 19 is supported via the cover portion 46 with the stopper portion 42a which is placed in a position a little above the floor frame 3. Therefore, the lower support structure of the rear support portion 19 is placed way below the floor frame 3, so that the distance between the vehicle body's lower surface and the road surface can be prevented from becoming shorter. Therefore, in the case where the stopper portion 42a or its vicinity comes into contact with an elevated place of the road surface while a vehicle is running, the stopper portion 42a can be prevented from coming into contact directly with the road surface. This largely reduces the frequency of situations in which the stopper portion 42a is broken. Hence, the possibility can be reduced to the utmost that a bump will take place at a vehicle's front part in a state where the support rigidity is deteriorated with which the front sub-frame 17 is connected to the rear support portion 19 by the stopper portion 42a.

(Other Embodiments)

Herein, in the above described embodiment, the branching portion 44a includes the attachment portion 42, and the stopper portion 42a is adjacent to the rear end of the branching portion 44a. However, the present invention is not limited to this. For example, the branching portion 44a, the attachment portion 42 and the stopper portion 42a may also be each separated. In that case, they protrude downward from the floor panel 8, the branching portion 44a which includes the stopper portion 42a is disposed close to the rear part of the attachment portion 42, or the attachment portion 42, the stopper portion 42a and the branching portion 44a are disposed in this order so that they are close to each other. Herein, even in this case, the stopper portion 42a is disposed adjacent to the floor frame 3.

The automobile front-part structure according to a first aspect of the present invention comprises: a pair of vehicle-body frames which extends in the front-and-rear directions along both sides of a vehicle, and whose front-end parts extend up to the front part of an automobile; and a front sub-frame which is supported with the vehicle-body frames in the front part of the vehicle, and is disposed below the vehicle-body frames, wherein the front sub-frame includes: a front sub-frame main-body which has, a pair of right and left side frames which extends in the front-and-rear directions of the vehicle, and a cross member which bridges the front parts of the side frames; a pair of right and left impact absorbing members which is disposed at the front-end parts of the side frames in the front sub-frame main-body, the impact absorbing members absorbing impact energy from ahead; and a reinforcement which bridges the front ends of both impact absorbing members.

According to this configuration, at the time of an offset collision, the impact absorbing member on the opposite side to the collision can absorb the impact energy via the reinforcement. In the case of a pole bump, both impact absorbing members can each absorb the impact energy, via the reinforcement. The automobile front-part structure according to a second aspect of the present invention is configured, in that according to the above described first aspect, so that the side frame has a substantially rectangular section, and is provided, at the front part thereof, with a support portion for the vehicle-body frame; the part of the side frame which is located ahead of the support portion: is formed so that the exterior wall thereof is located, in side view, substantially at the same height as the impact absorbing member; is molded so that the bottom wall near the front-end part of the side frame rises above the lower-end part of the exterior wall; and is formed so that the width in height of the section thereof is smaller than the width in height of the exterior wall; and the support portion is provided with an in-and-out cylindrical rubber bush which: has a cylindrical shape; is disposed so that the axis thereof is substantially along the up-and-down directions; and penetrates a hollow part of the side frame.

According to this configuration, the in-and-out cylindrical rubber bush which is provided in the support portion of the side frame becomes shorter in the up-and-down directions.

Thereby, the rubber bush itself becomes smaller and lighter. In addition, in this case, the front-end part of the side frame and its vicinity have a substantially-rectangular section, and the exterior wall which is located, in side view, substantially at the same height as the impact absorbing member extends in the front-and-rear directions of the vehicle. This keeps the above described front-end part and its vicinity from becoming less rigid because the rubber bush becomes smaller, increases the support rigidity of the impact absorbing member, and helps the impact absorbing member absorb more impact energy. Besides, there is no need to provide a reinforcement member which fixes the lower part of the rubber bush, thus preventing the productivity from deteriorating.

The automobile front-part structure according to a third aspect of the present invention is configured, in that according to the above described second aspect, so that the side frame is made up of an upper member and a lower member; the front-end part of the side frame and its vicinity have a closed section in the width directions of the vehicle which is formed by superposing, in the up-and-down directions, the lower member whose middle part rises above both right and left flat end-parts thereof and the upper member whose middle part rises more than the lower member does; and the lower-end part of the superposition part extends up to a height position near the lower surface of the impact absorbing member.

According to this configuration, the front-end part of the side frame and its vicinity are formed by superposing the upper member on the lower member in the up-and-down directions. This makes the rubber bush lighter, keeps the front-end part and its vicinity from becoming less rigid in the front-and-rear directions of the vehicle, and enhances the productivity. In addition, the superposition part is formed over the front-and-rear directions of the vehicle near the position in the height directions of the lower surface of the impact absorbing member. This makes the front-end part and its vicinity more rigid, and helps the impact absorbing member absorb more impact energy.

The automobile front-part structure according to a fourth aspect of the present invention is configured, in that according to the above described third aspect, so that a flange portion which is directed from the lower-end part of the superposition part toward the outside of the front-end part of the side frame is formed along the vehicle-width directions.

According to this configuration, the flange portion which is provided in the superposition part of the upper member and the lower member of the side frame is formed over the front-and-rear directions of the vehicle near the position in the height directions of the lower surface of the impact absorbing member. This makes the front-end part of the side frame and its vicinity more rigid, and helps the impact absorbing member absorb more impact energy.

The automobile front-part structure according to a fifth aspect of the present invention is configured, in that according to the above described second aspect, so that the upper member which forms the side frame is thicker than the lower member.

According to this configuration, the front-end part of the side frame and its vicinity become more rigid, and the impact absorbing member can absorb more impact energy.

The automobile front-part structure according to a sixth aspect of the present invention is configured, in that according to the above described first aspect, so that the side frame is provided with: a front support portion which is disposed at the front part of the side frame, and is a support portion for the vehicle-body frame; a rear support portion which is disposed at the rear part of the side frame, and is a support portion for the vehicle-body frame; a middle support portion which is disposed between the front support portion and the rear support portion, and is a support portion for the vehicle-body frame; and a bending facilitation portion which is disposed between the front support portion and the middle support portion, and causes the side frame to bend by a load in the front-and-rear directions of the vehicle. According to this configuration, the side frame of the front sub-frame is supported on the vehicle-body frame with the front support portion and the middle support portion, and the bending facilitation portion which bends downward by an impact load is provided between the front support portion and the middle support portion. Therefore, for example, in the case where a vehicle bumps at its front part into a lower obstacle, or in another such case, the front sub-frame bears a heavy impact load. At that time, the heavy impact load, which is applied when it has hit on the obstacle is first largely reduced by the impact absorbing member or the reinforcement. Thereafter, it is transmitted to the side frame, so that the side frame is bent downward. Hence, the structure in which the side frame is bent downward makes it possible to absorb the impact energy adequately. In addition, there is a case where an impact load is so heavy that the side frame is bent at the initial stage, and thereafter, the impact load is applied on the front end of the vehicle-body frame. Even in this case, this vehicle-body frame does not receive an upward load which is applied when the above described sub-frame has been bent upward. This makes the impact load lighter, using the shaft-compression deformation of the vehicle-body frame. Thereby, more impact energy can be absorbed. The automobile front-part structure according to a seventh aspect of the present invention is configured, in that according to the above described sixth aspect, so that the bending facilitation portion is formed in the side frame, and is formed by a bending portion which is disposed on the boundary between a front portion that inclines rearward and downward at a predetermined angle to the horizontal, and a rear portion that inclines rearward and downward substantially horizontally or at a narrower angle than the predetermined angle.

According to this configuration, the bending facilitation portion is formed in the side frame, only by adjusting the angle between the front portion and the rear portion. Thereby, it can be molded in a simple processing. The automobile front-part structure according to an eighth aspect of the present invention is configured, in that according to the above described seventh aspect, so that the front portion has a greater bending strength in the up-and-down directions than that of the rear portion. According to this configuration, when a vehicle has bumped, the front part of the bending facilitation portion can be kept from being deformed. Therefore, the impact absorbing member and the reinforcement are actively deformed, thus prompting these impact absorbing member and the reinforcement to absorb more impact energy. Besides, the front part of the bending facilitation portion is kept from being deformed so that the bending facilitation portion can certainly be bent downward. This surely prevents the above described sub-frame from coming into contact with the vehicle-body frame.

The automobile front-part structure according to an ninth aspect of the present invention is configured, in that according to the above described eighth aspect, so that the front portion is thicker than the rear portion.

According to this configuration, the front part of the bending facilitation portion can be kept from being deformed, despite a simple configuration. This presents the same advantage as in the configuration according to the above described eighth aspect.

The automobile front-part structure according to an tenth aspect of the present invention is configured, in that according to the above described ninth aspect, so that the rear portion is provided with: a width-extended portion which is wider in the vehicle-width directions than the front portion; and a narrow portion which is formed in a front position that is the boundary between the narrow portion and the front portion, and is narrower than the width-extended portion. According to this configuration, if the bending facilitation portion is bent downward when an automobile has bumped, the support structure part between the side frame and the middle part is prevented from being largely deformed. Thereby, the strength by which the side frame is connected to the middle part is kept from lowering. This allows the front sub-frame to absorb more energy.

The automobile front-part structure according to an eleventh aspect of the present invention is configured, in that according to the above described tenth aspect, so that the width-extended portion is provided with: a lower-arm support portion which is directed toward the outside of the vehicle, and supports a lower arm for supporting a front wheel in at least two places in the vehicle front-and-rear directions so that the lower arm is connected; and the middle support portion which is disposed between the lower-arm support portions.

According to this configuration, the lower arm which is a suspension arm can be supported on the rigid part of the front sub-frame. This offers both advantages in that, as described above, an impact load can be actively reduced, and an automobile's running stability can be enhanced.

The automobile front-part structure according to an twelfth aspect of the present invention is configured, in that according to the above described first aspect, so that a floor panel is provided which forms the floor surface of a vehicle compartment; the front sub-frame includes a front support portion and a rear support portion for the vehicle-body frame; the vehicle-body frame includes, a front side frame which extends in the front-and-rear directions of the vehicle from near the front end of a vehicle body to the front part of the vehicle compartment, a floor frame whose front end is connected to the rear part of the front side frame so that the floor frame is substantially along the directions where the front side frame extends, and extends toward the rear of the vehicle along the lower surface of the floor panel, and a branching frame which branches from near the front end of the floor frame toward the inside of the vehicle body, and extends rearward along the lower surface of the floor panel; the floor frame has a joint portion which is joined to the floor panel, and a protrusion portion which protrudes downward from the lower surface of the floor panel so that a closed section is formed between the protrusion portion and the floor panel; the branching frame has a joint portion which is joined to the floor panel, and a protrusion portion which protrudes downward from the lower surface of the floor panel so that a closed section is formed between the protrusion portion and the floor panel; and near the part branched off from the floor frame, an attachment portion is provided which the rear support portion of the front side frame is attached to, and behind the attachment portion and in a position adjacent to the floor frame, a stopper portion is provided whose lower surface protrudes downward from the attachment portion.

According to this configuration, if an automobile bumps, at its front part, into an obstacle which is lower than the front-end part of its vehicle-body frame, then the heavy impact load which is caused by this is transmitted, via the front sub-frame, to the attachment portion to which the rear support portion of the front sub-frame is attached. Then, the stopper portion bears such an impact load. At this time, this stopper portion can certainly receive the impact load and firmly disperse this impact load to the branching frame and the floor frame which each extend in the front-and-rear directions of the vehicle. This is because the stopper portion is formed adjacent to the floor frame, in the branching part which the branching frame and the floor frame branches off, or in its vicinity. Thereby, the impact energy which is given when an automobile bumps can be efficiently absorbed, thus keeping the front sub-frame from moving back without fail.

In addition, if an automobile bumps, at its front part, into an obstacle which is substantially as high as, or higher than, the front-end part of its vehicle-body frame, then the heavy impact load which is caused by this is transmitted to the floor frame, via the front part of the vehicle-body frame. At this time, the floor frame can bear this transmitted impact load. This is because the stopper portion is formed adjacent to the floor frame so that the floor frame becomes more rigid. As a result, more impact energy can be effectively absorbed.

The automobile front-part structure according to an thirteenth aspect of the present invention is configured, in that according to the above described twelfth aspect, so that the lower surface of the attachment portion is higher than that of the floor frame which is located at least near the attachment portion.

According to this configuration, the lower surface of the attachment portion is higher than that of the floor frame, which is located near the attachment portion. Therefore, in the case where the attachment portion or its vicinity comes into contact with an elevated place of the road surface while an automobile is running, the attachment portion can be prevented from coming into contact directly with the road surface and being broken. This makes it possible to absorb more impact energy, and certainly keep the front sub-frame from retreating.

The automobile front-part structure according to an fourteenth aspect of the present invention is configured, in that according to the above described thirteenth aspect, so that the stopper portion is provided with an extension support portion which extends toward the attachment portion; and the rear support portion of the front sub-frame is provided with an in-and-out cylindrical rubber bush which has a substantially-cylindrical external shape and is disposed so that the axis thereof is substantially along the up-and-down directions, and this rubber bush is sandwiched between the attachment portion and the extension support portion and is tightened to the attachment portion.

According to this configuration, the upper-end part and the lower-end part of the rubber bush which forms the rear support portion of the front sub-frame is connected and supported, via the attachment portion and the extension support portion, to the stopper portion so that it has a great rigidity. Therefore, the impact load, which is transmitted through the front sub-frame can certainly be transferred to the stopper portion. This makes it possible to absorb more impact energy, and certainly keep the front sub-frame from retreating.

The automobile front-part structure according to an fifteenth aspect of the present invention is configured, in that according to the above described fourteenth aspect, so that the lower surface of the stopper portion is higher than that of the floor frame which is adjacent to the stopper portion, and is lower than the lower surface of the attachment portion.

According to this configuration, the lower surface of the stopper portion, which is connected and supported to the extension support portion is higher than the lower surface of the floor frame. Therefore, in the case where the stopper portion or its vicinity comes into contact with an elevated place of the road surface while an automobile is running, the stopper portion can be prevented from coming into contact directly with the road surface. This largely reduces the frequency of situations in which the stopper portion is broken. Hence, the possibility can be reduced to the utmost that a bump will take place at a vehicle's front part in a state where the support rigidity is deteriorated in the rear support portion of the front sub-frame which is supported on the stopper portion. This makes it possible to absorb more impact energy, and certainly keep the front sub-frame from retreating.

The automobile front-part structure according to an sixteenth aspect of the present invention is configured, in that according to the above described thirteenth aspect, so that a reinforcement frame is provided which: connects the right and left attachment portions; and is joined to the floor panel so that a closed section is formed between the reinforcement frame and the floor panel in the front-and-rear directions of the vehicle.

According to this configuration, the impact load, which is transmitted to the attachment portion when an automobile has bumped can be transferred to the attachment portion on one side through the reinforcement frame. This makes it possible to improve the performance of absorbing the impact energy more certainly.

The automobile front-part structure according to an seventeenth aspect of the present invention is configured, in that according to the above described thirteenth aspect, so that: near both ends of the floor panel in the vehicle-width directions, side sills extend in the front-and-rear directions of the vehicle; and a connection frame is provided which connects the part near the branching part of the floor frame and the front part of the side sill.

According to this configuration, the impact load, which is transmitted to the attachment portion when an automobile has bumped can be transferred to the side sill. This makes it possible to improve the performance of absorbing the impact energy more certainly.

The automobile front-part structure according to an seventeenth aspect of the present invention is configured, in that according to the above described thirteenth aspect, so that: both impact absorbing members and the reinforcement are united, and are attached to the sub-frame main-body so as to be attached and detached.

According to this configuration, if an impact load is light to some extent, the sub-frame main-body is not deformed. In other words, only both right and left impact absorbing members and the reinforcement are deformed, so that the impact energy can be absorbed. This makes it easy to do repairs only by replacing the impact absorbing members and the sub-frame which are attached to the front part of the sub-frame main-body so as to be attached and detached. Thus, repair costs can be effectively cut down.

The automobile front-part structure according to an nineteenth aspect of the present invention is configured, in that according to the above described first aspect, so that: a bumper frame is provided which bridges the front parts of the vehicle-body frames; and the reinforcement is disposed below the bumper frame in the up-and-down directions, and is disposed slightly behind the bumper frame in the front-and-rear directions. According to this configuration, at the time of an extremely-light bump in which an impact load is extremely light, the front side frame and the front sub-frame are not deformed. In other words, only the bumper frame is deformed, so that the impact energy can be absorbed. This makes it easy to do repairs only by replacing this bumper frame. In addition, at the time of a light bump in which an impact load is slightly heavier than that of this extremely-light bump, the front side frame and the front sub-frame are not deformed. In other words, only the bumper frame and the impact absorbing member are deformed, so that the impact energy can be absorbed. Therefore, repairs can be down only by replacing the bumper frame and the impact-absorbing member, which is attached to the front sub-frame.

This application claims priority from Japanese Patent Application Serial Nos. 2004-090190, 2004-090191, and 2004-090192, all of which were filed in Japan Patent Office on Mar. 25, 2004, the contents of which are hereby incorporated by reference under 37CFR § 1.57(a).

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle front-part structure, comprising:
   a vehicle-body frame including a pair of front side frames, each of which extends in the front-and-rear directions along both sides of the vehicle, and whose front-end parts extend up to the front part of the vehicle; and
   a front sub-frame which is supported with the vehicle-body frames in the front part of the vehicle, and is disposed below the vehicle-body frames,
   wherein the front sub-frame includes:
   a front sub-frame main-body having:
   a pair of right and left side frames which extends in the front-and-rear directions of the vehicle, and
   a cross member which bridges the front parts of the side frames;
   a pair of right and left impact absorbing members which is disposed at the front-end parts of the side frames in the front sub-frame main-body, the impact absorbing members absorbing impact energy from ahead; and
   a reinforcement which bridges the front ends of both impact-absorbing members.

2. The vehicle front-part structure according to claim 1, wherein:
   the side frame has a substantially rectangular section, and is provided, at the front part thereof, with a support portion for the vehicle-body frame;
   the part of the side frame which is located ahead of the support portion: is formed so that the exterior wall thereof is located, in side view, substantially at the same vertical dimension as the impact absorbing member, and is molded so that the bottom wall near the front-end part of the side frame rises above the lower-end part of the exterior wall and is formed so that the vertical dimension of the section thereof is smaller than that of the exterior wall; and
   the support portion is provided with an in-and-out cylindrical rubber bush that has a cylindrical shape and is disposed so that the axis thereof is substantially along the up-and-down directions; and penetrates a hollow part of the side frame.

3. The vehicle front-part structure according to claim 2, wherein:
the side frame is made up of an upper member and a lower member;
the front-end part of the side frame and its vicinity have a closed section in the width directions of the vehicle which is formed by superimposing, in the up-and-down directions, the lower member whose middle part rises above both right and left flat end-parts thereof and the upper member whose middle part rises more than the lower member does; and
the lower-end part of the superposition part extends up to a height position near the lower surface of the impact absorbing member.

4. The vehicle front-part structure according to claim 3, wherein a flange portion which is directed from the lower-end part of the superposition part toward the outside of the front-end part of the side frame is formed along the vehicle-width directions.

5. The vehicle front-part structure according to claim 2, wherein the side frame is formed so that the upper member is thicker than the lower member.

6. The vehicle front-part structure according to claim 1, wherein the side frame is provided with:
a front support portion which is disposed at the front part of the side frame, and is a support portion for the vehicle-body frame;
a rear support portion which is disposed at the rear part of the side frame, and is a support portion for the vehicle-body frame;
a middle support portion which is disposed between the front support portion and the rear support portion, and is a support portion for the vehicle-body frame; and
a bending facilitation portion which is disposed between the front support portion and the middle support portion, and causes the side frame to bend by a load in the front-and-rear directions of the vehicle.

7. The vehicle front-part structure according to claim 6, wherein the bending facilitation portion is formed in the side frame, and is formed by a bending portion which is disposed on the boundary between a front portion that inclines rearward and downward at a predetermined angle to the horizontal, and a rear portion that inclines rearward and downward substantially horizontally or at a narrower angle than the predetermined angle.

8. The vehicle front-part structure according to claim 7, wherein the front portion has a greater bending strength in the up-and-down directions than that of the rear portion.

9. The vehicle front-part structure according to claim 8, wherein the front portion is thicker than the rear portion.

10. The vehicle front-part structure according to claim 9, wherein the rear portion is provided with:
a width-extended portion which is wider in the vehicle-width directions than the front portion; and
a narrow portion which is formed in a frontal position of the rear portion that is the boundary between the narrow portion and the front portion, and is narrower than the width-extended portion.

11. The vehicle front-part structure according to claim 10, wherein the width-extended portion is provided with:
a lower-arm support portion which is directed toward the outside of the vehicle, and supports a lower arm for supporting a front wheel in at least two places in the vehicle front-and-rear directions so that the lower arm is connected; and
the middle support portion which is disposed between the lower-arm support portions.

12. The vehicle front-part structure according to claim 1, further comprising:
a floor panel forming a floor surface of a vehicle compartment;
wherein:
the front sub-frame includes a front support portion and a rear support portion for the vehicle-body frame;
the vehicle-body frame includes,
a front side frame which extends in the front-and-rear directions of the vehicle from near the front end of a vehicle body to the front part of the vehicle compartment,
a floor frame whose front end is connected to the rear part of the front side frame so that the floor frame is substantially along the directions where the front side frame extends, and extends toward the rear of the vehicle along the lower surface of the floor panel, and
a branching frame which branches from near the front end of the floor frame toward the inside of the vehicle body, and extends rearward along the lower surface of the floor panel;
the floor frame has a joint portion which is joined to the floor panel, and a protrusion portion which protrudes downward from the lower surface of the floor panel so that a closed section is formed between the protrusion portion and the floor panel;
the branching frame has a joint portion which is joined to the floor panel, and a protrusion portion which protrudes downward from the lower surface of the floor panel so that a closed section is formed between the protrusion portion and the floor panel; and
the floor frame is provided with, near a part branched off therefrom, an attachment portion attached to the rear support portion of the front side frame, and is provided with, behind the attachment portion and in a position adjacent to the floor frame, a stopper portion whose lower surface protrudes downward from the attachment portion.

13. The vehicle front-part structure according to claim 12, wherein the lower surface of the attachment portion is higher than that of the floor frame which is located at least near the attachment portion.

14. The vehicle front-part structure according to claim 13, wherein:
the stopper portion is provided with an extension support portion which extends toward the attachment portion; and
the rear support portion of the front sub-frame is provided with an in-and-out cylindrical rubber bush which has a substantially-cylindrical external shape and is disposed so that the axis thereof is substantially along the up-and-down directions, and said rubber bush is sandwiched between the attachment portion and the extension support portion and is tightened to the attachment portion.

15. The vehicle front-part structure according to claim 14, wherein the lower surface of the stopper portion is higher than that of the floor frame which is adjacent to the stopper portion, and is lower than the lower surface of the attachment portion.

16. The vehicle front-part structure according to claim 13, further comprising a reinforcement frame connecting the right and left attachment portions; and joining to the floor panel so that a closed section is formed between the reinforcement frame and the floor panel in the front-and-rear directions of the vehicle.

17. The vehicle front-part structure according to claim 13, further comprising: side sills provided near both ends of the floor panel in the vehicle-width directions, the side sills extending in the front-and-rear directions of the vehicle; and a connection frame connecting the part near the branching part of the floor frame and the front part of the side sill.

18. The vehicle front-part structure according to claim 1, wherein, the both impact absorbing members and the reinforcement are united, and are detachably attached to the sub-frame main-body.

19. The vehicle front-part structure according to claim 1, further comprising:

a bumper frame bridging the front parts of the front side frames;

wherein the reinforcement is disposed below the bumper frame in the up-and-down directions, and is disposed slightly behind the bumper frame in the front-and-rear directions.

* * * * *